United States Patent [19]

Azarowicz

[11] 3,769,164
[45] Oct. 30, 1973

[54] MICROBIAL DEGRADATION OF PETROLEUM

[75] Inventor: Edward N. Azarowicz, Vienna, Va.

[73] Assignee: Bioteknika International, Inc., Alexandria, Va.

[22] Filed: June 3, 1970

[21] Appl. No.: 43,226

[52] U.S. Cl.................. 195/2, 195/3 H, 195/28 R, 210/11
[51] Int. Cl................................................ C12b 1/00
[58] Field of Search.................. 195/3 R, 3 H, 28 R; 210/40, 41, 42, 11, DIG. 21, 1, 2, 10, 17

[56] References Cited
UNITED STATES PATENTS

| | | | |
|---|---|---|---|
| 3,616,204 | 10/1971 | Linn.................................... | 195/3 H |
| 3,634,227 | 1/1972 | Patterson............................ | 195/3 H |

OTHER PUBLICATIONS

Little, A. Combating Pollution Created by Oil Spills, Report of Dept. of Transp., p. 87–94 and 96–97, June 30, 1969

Johnson, M. "Science," Vol. 155, p. 1515–1519, 3/24/67.

Primary Examiner—A. Louis Monacell
Assistant Examiner—Gary M. Nath
Attorney—Raymond C. Stewart and Joseph A. Kolasch

[57] ABSTRACT

A process for the microbial degradation of petroleum by treating the petroleum or oil with particular microorganisms which are capable of utilizing hydrocarbons as an energy and carbon source. The process is used, for example, to clean up oil spillage as it may occur on the open sea, inland fresh waters, beaches, rockbound shore lines, harbors, etc. and for cleaning closed containers, such as tanker bottoms or storage tanks containing heavy tar fractions, asphalts and heavy, viscous crude oil residues. The end result of the process is to restore oil-polluted marine, benthic and littoral environments to habitable, ecologically-clean environments. The microorganisms employed are edible and completely non-pathogenic to marine fauna and flora as well as to humans and animals.

25 Claims, No Drawings

MICROBIAL DEGRADATION OF PETROLEUM

BACKGROUND OF THE INVENTION

This invention relates to a process for the microbial degradation of petroleum. More particularly, it relates to a method for degrading petroleum substances, whether crude or refined, by means of microorganisms as a way of, for example, cleaning up oil spillage as it may occur on the open sea, inland fresh waters, sandy beaches, shingle beaches, rock-bound shore lines, boulder-strewn beaches, tidal pools and harbors. The invention is also applicable for cleaning closed containers, such as, for example, tanker bottoms or storage tanks containing crude petroleum, heavy tar fractions, asphalts and heavy, viscous crude oil residues.

Environmental clean-up is of much concern to the country and to the world today. Air and water pollution are major problems in today's technological society. As far as water pollution is concerned, oil spillage has become an increasing problem with the advent of off-shore drilling and the transport of petroleum in very large tankers. Many proposals have been made for cleaning up and/or degrading such oil spillages, but none has been satisfactorily successful to date.

The desired end result of oil degradation is to restore oil-polluted marine, benthic and littoral environments to habitable, ecologically-clean environments. The use of materials primarily of biological origin which are not only oil-degrading, but are also edible, beneficial and completely non-pathogenic to marine fauna and flora, would be especially advantageous. Synthetic detergents, emulsifying agents, organic solvents or other toxic products of the chemical process or the petrochemical industries, proposed heretofore, do not possess the advantages inherent in the use of materials of biological origin. In fact, the use of synthetic chemicals very often results in the massive killing of marine fauna and flora over a wide geographical area.

Four main approaches have been used in the art up to the present time for cleaning oil spills. They are as follows:

1. The use of skimming barges to remove oil from the surface of the water. The oil which is removed must be disposed of or reclaimed. The skimming barges are, however, useful on calm waters only. This is a physical method.

2. The use of booms or barriers to contain the oil slick which is to be skimmed off the surface of the oil-polluted waters. This physical method has been used on calm waters.

3. The use of chemical dispersants, detergents and solvents, as discussed briefly above. Since most or all of these chemicals are toxic to benthic, littoral and marine life, widespread use thereof is not to be expected.

4. Burning of the crude oil has been attempted, but oil does not undergo complete combustion, and the unburned black smoke is toxic. Another possible danger resides in the fact that the incompletely combustible oil fractions containing phenanthrenes, anthracenes and derivatives thereof are among the most potent chemical carcinogens known to man.

One of the objects of the present invention is to provide an improved procedure for degrading and cleaning up oil spillages on the open sea which overcomes the disadvantages and deficiencies of the prior art.

Another object of the present invention is to provide a process for the microbial degradation of petroleum wherever desired, for example, as a means of cleaning up oil spills or for cleaning tanker holds or vessels or storage tanks containing undesirable petroleum crudes, heavy tar fractions, asphalts and heavy, viscous crude oil residues.

A further object of the invention is to provide a procedure for degrading various petroleum substances readily, efficiently and relatively economically.

A still further object of the invention is to provide microorganisms that are capable of degrading petroleum fractions, leaving an edible and beneficial cell mass, and which are completely non-pathogenic to marine fauna and flora, humans and animals.

Yet another object of the invention is to provide a method for the degradation of oil wherein there is no need for the handling, transporting and storage of heavy, bulky equipment.

These and other objects and advantages of the present invention will become apparent to those skilled in the art from a consideration of the following specification and claims.

SUMMARY OF THE INVENTION

In accordance with the present invention, the above objectives are attained and an advantageous procedure for the microbial degradation of oil and petroleum has been discovered employing particular hydrocarbon-utilizing microorganisms. The distinct, unique advantage of the present invention is that all of the materials used are derived originally from edible substances which are not toxic. It is applicable equally to petroleum degradation and to the degradation of other industrial wastes in general, such as effluents from food canning or preparing factories, paper mills, dairies and chemical plants discharging solvents, plasticizers, alcohols, aldehydes, ketones, organic acids, phenolics and other cyclic compounds into the environment. The expression "petroleum" as used throughout this application is intended to designate crude petroleum as well as petroleum fractions and petroleum-derived products, such as aliphatic and aromatic hydrocarbons, alcohols, aldehydes, ketones, organic acids, phenols, naphthalenes, phenanthrenes, anthracenes, esters, etc. Thus, the term "petroleum" as used herein refers to organic carbon-containing compounds, including straight- and branched-chain alkanes (including paraffins of varying molecular weights) and other aliphatic compounds (including alicyclics such as cyclohexane) as well as aromatic heterocyclic and carbocyclic compounds.

The ultimate fate of oily wastes as well as wastes including those of organic origin entering natural waters has been accepted to be degradation (oxidation) by the combined activities of bacteria, actinomycetes, yeasts and imperfect fungi. Such organisms may be of marine or of terrestrial origin and may be non-pathogenic. Advantage has been taken in the present invention of judiciously choosing microorganisms which have been adapted to utilize highly selected carbon compounds for the energy source and carbon requirements for their growth.

The process of the present invention for use in, for example, cleaning up spilled oil, is a purely biological process in which selected bacteria, actinomycetes, yeasts and filamentous fungi break down the crude petroleum and convert the masses of spilled oil into masses of edible, non-toxic living cells. This cell mass is channeled into the food chain to feed higher forms of marine life and, thus, a very advantageous end result is achieved in addition to solving the problem of oil or petroleum spillage. There is no need for ancillary clean-up operations when an oil spill is degraded in accordance with the invention and, as pointed out above, there is also no need for the handling, transporting and storing of heavy, bulky equipment.

The following microorganisms, all completely novel and unobvious, are utilized in the present invention. These microorganisms are special species which have been mutated to achieve the objectives of the invention. They have been deposited with the American Type Culture Collection in Rockville, Maryland and given the designated ATCC catalogue numbers:

Candida parapsilosis, Y15 ATCC 20246
Candida tropicalis, Y14 ATCC 20247
Candida utilis, Y13 ATCC 20248
Aureobasidium pullulans, 1 ATCC 20249
Myrothecium verrucaria, 1 ATCC 20250
Cladosporium cladosporioides, 1 ATCC 20251
Saccharomyces cerevisiae, Y16 ATCC 20252
Aspergillus sp., K ATCC 20253
Rhodotorula sp., Y17 ATCC 20254
Candida lipolytica, Y12 ATCC 20255
Nocardia corallina, N-301 ATCC 21504
Nocardia globerula, N-39 ATCC 21505
Nocardia globerula, N-45 ATCC 21506
Nocardia opaca, N-300 ATCC 21507
Nocardia rubra, N-2 ATCC 21508
Nocardia paraffinae, N-114 ATCC 21509

These microorganisms have the characteristics shown in the following Tables. All of the indicated tests are standard ones used in the microbiological field.

TABLE 1A

Bacteria

| Characteristics | Nocardia corallina N301 ATCC 21504 | Nocardia globerula N39 ATCC 21505 | Nocardia globerula N45 ATCC 21506 |
|---|---|---|---|
| Gram strain | Gram positive bacilli, few branches | Gram positive rods | Gram positive rods few branches |
| Motility | Non-motile | Non-motile | Non-motile |
| Mannitol with ammonium salts | | | |
| Growth on glucose agar, pigmentation | Moderate, smooth, orange pigment | Heavy, smooth, ivory colored | Heavy, smooth, ivory colored |
| Growth at 25° and 37°C. | | Good at 25°C Poor at 37°C. | Good at 25°C. Poor at 37°C. |
| Growth in 7% NaCl broth | | | |
| Starch hydrolyzed | | | |
| Nitrites produced from nitrates | + | − | − |
| Growth in thioglycollate broth | Heavy aerobic, light anaerobic | Light aerobic and anaerobic | Heavy aerobic, light aerobic |
| Indole production | − | | − |
| Gelatine liquefaction | − | − | − |
| Citrate utilization | + | + | |
| Urease | + | + | + |
| Pellicle in broth | | Slight pellicle | Slight pellicle |
| Hemolysis or blood agar with sheep RBC | | | |
| Bile solubility | | | |
| Coagulase in plasma | | | |
| H₂S in KI or TSI slants | | | |
| Utilization of carbohydrates:* | | | |
| Lactose | − | − | + |
| Sucrose | − | + | + |
| Glucose | − | + | + |
| Mannitol | | | |
| Rhamnose | − | | |
| Arabinose | | | |
| Xylose | | | |
| Galactose | − | + | − |
| Maltose | − | + | + |
| Raffinose | − | + | − |
| Glycerol | | + | + |
| Chitin | − | | − |

*+ Indicates acid production

| | | | |
|---|---|---|---|
| N-acetyl-D-glucosamine | | | |
| Oxidase test | | | |
| Catalase activity | | | |
| JP-4 fuel | | | |
| Crude petroleum | utilized | utilized | utilized |
| Paraffins | utilized | utilized | utilized |
| Phenol | utilized | utilized | utilized |
| Naphthalene | | | |

TABLE 1B

Bacteria

| Characteristics | Nocardia opaca N300 ATCC 21507 | Nocardia rubra N2 ATCC 21508 | Nocardia paraffinae N114 ATCC 21509 |
|---|---|---|---|
| Gram strain | Gram positive bacilli, few branches | Gram positive rudimentary mycelium fragmenting into short arthrospores | Gram positive rudimentary mycelium fragmenting into short arthrospores |
| Motility | Non-motile | Non-motile | |
| Mannitol with ammonium salts | | | |
| Growth glucose agar, pigmentation | Moderate, smooth, orange | Moderate, smooth, orange red pigment | Moderately heavy, rough, orange |
| Growth at 25° and 37°C. | Optimum at 30° C. | Grows well at 30° C. | |
| Growth in 7% NaCl broth | | | |
| Starch hydrolyzed | | | |
| Nitrites produced from nitrates | + | − | |
| Growth in thioglycollate broth | Heavy aerobic, no anaerobic | Heavy aerobic, light anaerobic | Light aerobic and anaerobic |
| Indole production | | | |
| Gelatin liquefaction | − | | − |
| Citrate utilization | + | | |
| Urease | + | − | − |
| Pellicle in broth | | | |
| Hemolysis or blood agar with sheep RBC | | | |
| Bile solubility | | | |
| Coagulase in plasma | | | |
| H₂S in KI or TSI slants | | | |
| Utilization of carbohydrates:* | | | |
| Lactose | − | − | − |

| | | |
|---|---|---|
| Sucrose | – | – |
| Glucose | – | – |
| Mannitol | | |
| Rhamnose | | |
| Arabinose | | |
| Xylose | | |
| Galactose | – | – |
| Maltose | – | – |
| Raffinose | – | – |
| Glycerol | | |
| Chitin | – | – |
| N-acetyl-D-glucosamine | | |
| Oxidase test | | |
| Catalase activity | | |
| JP-4 fuel | | |
| Crude petroleum | Utilized | Utilized |
| Paraffins | Utilized | Utilized |
| Phenol | Utilized | |
| Naphthalene | Utilized | |

TABLE 2.—YEASTS

| Characteristics | Candida parapsilosis Y15 ATCC 20246 | Candida tropicalis Y14 ATCC 20247 | Candida utilis Y13 ATCC 20248 | Saccharomyces cerevisiae Y16 ATCC 20254 | Rhodotorula sp. Y17 ATCC 20254 | Candida lipolytica Y12 ATCC 20255 |
|---|---|---|---|---|---|---|
| Growth on glucose agar, pigmentation. | Heavy, smooth, ivory colored. | Heavy, smooth, ivory colored. | Heavy, smooth, ivory colored. | Heavy, smooth, ivory colored | Heavy, smooth, orange colored. | Slightly rough, dull ivory. |
| Growth in thioglycollate broth | Light growth | Moderate growth | Heavy anaerobic growth. | Light aerobic heavy anaerobic. | Heavy aerobic Light anaerobic. | |
| Citrate utilization | + | + | + | | – | |
| Urease | – | – | – | – | + | – |
| Utilization of carbohydrates:* | | | | | | |
| Lactose | – | – | – | – | – | |
| Sucrose | + | + | – | + | + | – |
| Glucose | + | + | + | + | – | + |
| Chitin | – | – | – | – | | |
| Galactose | + | + | – | + | – | – |
| Maltose | + | + | – | + | + | – |
| Raffinose | – | + | + | + | + | |
| Glycerol | + | + | + | – | | |
| Gelatin liquefaction | | | | | | + |
| JP-4 jet fuel | | | | | | Utilized. |

*+Indicates acid production.

TABLE 3.—FILAMENTOUS FUNGI

| Characteristics | Aureobasidium pullulans 1 ATCC 20249 | Myrothecium verrucaria 1 ATCC 20250 | Cladosporium cladosporioides 1 ATCC 20251 | Aspergillus sp. K. ATCC 20253 |
|---|---|---|---|---|
| Spores | Present | Present | Present | Present. |
| Type of spores | Blastospores laterally on hyphae. | Small Conidia | Branched chains of blastospores. | V Conidia in chains. |
| Type of Fruiting structures | | Sporodochium | Geniculate conidiophores | Conidial head forms a vesicle bearing phialides. Cleistothecia not found. |
| Medium discoloration | Slight discoloration in old cultures. | White surface mat in broth culture. | Slight brown discoloration from old sporulated culture. | None. |
| Odor | None definite | Almost no odor | Very little musty odor | Earthy. |
| Factors affecting fruiting: | | | | |
| Temperature | 25° C | 25° C | 25° C | 25° C. |
| Light | None | None | None | None. |
| Preferred medium | Sabouraud's glucose agar | Sabouraud's glucose broth or agar. | Sabouraud's glucose agar | Sabouraud's glucose agar. |
| Other | Growth pasty and yeast-like; ivory-colored, turning black, leathery in old cultures. | Heavy surface mat, white colored and heavy subsurface growth. | | |

All of the above microorganisms are terrestrial or fresh water forms. One of the unique and distinct characteristics of all of the above microorganisms is that they are hydrocarbon-utilizing and will attack and degrade petroleum in accordance with the objectives of the invention.

Varied media are required for the different purposes of handling these cultures. All of the microorganisms employed in the present invention will grow on media with 100 percent marine water or with part marine water and part distilled water. For the purpose of identifying the cultures, all of the usual standard biochemical reactions shown in the above Tables were observed on media made with distilled water in order to provide standard, comparative growth conditions.

The following medium has been found to be quite satisfactory as a general use, all-purpose medium for, for example, maintaining stock cultures:

All-Purpose Medium

| | |
|---|---|
| Heart infusion broth (Difco) | 23.0 g. |
| Yeast extract | 3.0 g. |
| Glycerol | 5.0 ml. |
| Glucose | 5.0 g. |
| Agar | 15.0 g. |
| $H_2O$ (distilled) | 1000 ml. |

The standard Bushnell-Haas Broth is used for the study of hydrocarbon utilization by microorganisms. The following medium has been found to be quite suitable for this purpose in connection with the microorganisms employed in the present invention:

| | |
|---|---|
| $MgSO_4$ | 0.2 g. |
| $CaCl_2$ | 0.02 g. |
| $KH_2PO_4$ | 1.0 g. |
| $K_2HPO_4$ | 1.0 g. |
| $NH_4NO_3$ | 1.0 g. |
| $FeCl_3$ | 0.05 g. |
| Bromthymol blue | 0.008 g. |
| $H_2O$ | 1000 ml. |

The following medium has been found to be preferred and advan-tageous for the large-scale production of microbial cells:

| | |
|---|---|
| Cottonseed protein | 5.0 g. |
| $NH_4NO_3$ | 2.5 g. |
| $(NH_4)_2HPO_4$ | 2.5 g. |
| $MgSO_4$ | 0.2 g. |
| $K_2HPO_4$ | 1.0 g. |
| Crude petroleum | 5.0 ml. |
| Marine salt | 35.0 g. |
| Tap water | 1000 ml. |

Instead of the marine salt and tap water, native sea water can be used in the above medium. Aeration is provided to supply oxygen to the fermentor vessel or tank. Generally, the bacterial cells are harvested after about two days, the actinomycete cells are harvested after about four days, the yeast cultures are harvested after about five days depending on turbidity, and the fungal cultures are harvested after about five days. The large batch vessel or fermentor is seeded with a young culture equivalent to about 5 to 8 percent of the total capacity of the fermentor. If necessary, an antifoam agent can be employed, for example, Dow Antifoam A.

Hence, either a synthetic culture medium or a natural nutrient medium is suitable for the growth of the microorganism strains employed in the present invention as long as it contains the essential nutrients for the growth of the particular microorganism strain or strains used. Such nutrients are well known in the art and include substances such as a carbon source, a nitrogen source, inorganic compounds and the like which are utilized by the microorganisms employed in appropriate amounts.

The microorganisms used herein grow and survive in an aqueous nutrient medium containing a hydrocarbon or a mixture of hydrocarbons as the main carbon source. Such hydrocarbons include straight and branched-chain paraffins (alkanes) ranging from gaseous alkanes, such as methane and propane, liquid or semi-solid alkanes, such as n-pentane, n-octane, n-decane, n-dodecane, n-hexadecane, isopentane, isooctane, and including long-chain solid paraffins having high melting points, cycloparaffins such as cyclohexane and cyclooctane, straight- and branched-chain olefins such as pentene-2, hexene-1, octene-1, octene-2, etc., cycloolefins such as cyclohexene, aromatic hydrocarbons such as benzene, o-xylene, naphthalene, phenanthrenes, anthracenes, etc., and mixtures thereof as well as mixed hydrocarbons such as kerosene, light oils, heavy oils, paraffin oils, petroleum crudes, jet fuels, gasoline, etc. Other organic substances, such as alcohols, aldehydes, ketones, organic acids, phenolics and aromatic heterocyclic and carbocyclic compounds, are utilized by the present microorganisms.

Small amounts of other carbon sources such as carbohydrates, for example, glucose, fructose, maltose, sucrose, starch, starch hydrolysate, molasses, etc., or any other suitable carbon source such as glycerol, mannitol, sorbitol, organic acids, etc. may be used in the culture medium along with the hydrocarbon. These substances may be used either singly or in mixtures of two or more.

As a nitrogen source, various kinds of inorganic or organic salts or compounds, such as urea or ammonium salts such as ammonium chloride, ammonium sulfate, ammonium nitrate, ammonium phosphate, etc., or one or more than one amino acid or crude proteins mixed in combination, or natural substances containing nitrogen, such as cornsteep liquor, yeast extract, meat extract, fish meal, peptone, bouillon, casein hydrolysates, fish solubles, rice bran extract, etc., may be employed. These substances may also be used either singly or in combinations of two or more.

Inorganic compounds which may be added to the culture medium include magnesium sulfate, sodium phosphate, potassium dihydrogen phosphate, potassium monohydrogen phosphate, iron sulfate or other iron salts such as ferric trichloride, manganese chloride, calcium chloride, sodium chloride, ammonium nitrate, etc.

The microorganisms employed in the present invention are cultured under aerobic conditions, such as aerobic shaking of the culture or with stirring and aeration of a submerged culture, at a temperature of, for example, about 5° to 35°C. and at a pH of, for example, about 6 to 8. The microorganisms are harvested at an appropriate time and are used as discussed below.

DETAILED DESCRIPTION OF THE PREFERRED EMBODIMENTS

The process of the invention can be used to remove petroleum and petroleum fractions from locations wherever its presence constitutes a deleterious pollution. Thus, with this process, it becomes possible to clean up oil spillage on the open sea, on sandy beaches, shingle beaches, rocky coast lines, harbors and inland waters. There is no restriction as to the fraction of petroleum which is degradable. Accordingly, the process can be employed to degrade alkanes, alkenes, alkynes, phenols, naphthalenes, phenanthrenes, anthracenes, organic acids, aldehydes, ketones, esters and the like, i.e., organic carbon-containing compounds, including acyclic, alicyclic, heterocyclic and carbocyclic compounds.

As examples, the following oils and oil mixtures have been degraded completely or essentially completely using the process of the present invention:

OIL SAMPLE NO. 1

| Quaker State oil (SAE 20-20W) | 950.0 ml. |
| Kerosene (Amoco) | 200.0 ml. |
| Gasoline (Esseo "regular") | 50.0 ml. |
| Paraffin (Gulf), solid | 50.0 g. |
| *Creolin | 1.25 ml. |
| Sulfur, yellow powder | 2.5 g. |

*A general purpose disinfectant made by Plough Inc. consisting of coal tar, neutral oils, phenols, soap an inert ingredients (10 percent water)

OIL SAMPLE NO. 2

Kirkuk Crude (Iraq) having the following characteristics:

| Gravity, API | 35.7 |
| Pour point | −15°F. |
| Sulfur | 1.95% |
| Conradson Carbon, WT% | 3.26 |
| Viscosity at 100°F., cs | 4.78 |

OIL SAMPLE NO. 3

JP-4 jet fuel

OIL SAMPLE NO. 4

Bunker C fuel

OIL SAMPLE NO. 5

Venezuelan crude oil

Thus, the present invention can also be used to clean, for example, storage tanks or the hold compartments of oil tanker vessels in view of the wide diversity of petroleum substances degradable by means of the microorganisms described herein.

A preferred mode of combating oil or petroleum spillage will now be described. It is best to use a mixture of most or all of the microorganisms in order to obtain a broad spectrum of degradability, although single species of microorganisms or selected mixtures of the described microorganisms can be used in special situations. The microorganisms are seeded or dispersed over an oil-spilled area by means of boats, aircraft or other vehicles as appropriate. The mixture employed preferably includes a cellulose absorbent to prevent the oil from spreading. The cellulose absorbent is, for example, straw, bagasse, pine bark mulch, sawdust or other forest or agricultural products. Additive nutrients for the microorganisms are also mixed with the absorbent, such as cottonseed protein and inorganic salts of nitrogen and phosphorus for example. Included in the mixture is a number of selected microbial species chosen for the particular clean-up operation, depending upon the type of oil, geographical location and time of year (temperature). The process is applicable from just above freezing temperature (about 2°C.) to about 39°C. The work of oil degradation will begin at once upon spreading the mixture on the oil surface. The evidence of oil degradation becomes increasingly more evident each day. Complete degradation may take place as early as one week, but may take longer depending upon the amount of oil spillage and the temperature conditions.

It is not necessary to use an absorbent, and the microorganisms can be used as a slurry or in dry pelletized form with added nutrients.

When the number of gallons of oil spilled is unknown, as from an off-shore well, the concentration of microorganisms added to the mixture of absorbent and nutrient supplements should be at least about 2 lbs. of wet packed cells per acre. When the number of gallons of oil in an oil spill is known, the amount of mixture of microorganisms, absorbent and additive nutrients employed should be at least sufficient to provide a thin seeding of several percent (W/V). About 1 to 5 percent is desirable. Amounts substantially less than this are slower acting although still effective, while substantially greater amounts are unnecessary except in special situations.

The process of the invention is a purely biological process in which selected bacteria, actinomycetes, yeasts and filamentous fungi break down the crude petroleum or organic wastes and utilize the hydrocarbons as the carbon source for growth. The process results in the conversion of many tons of spilled oil into many tons of microbial cells which, in turn, become food for plankton, shellfish and other marine life. Since all of the microorganisms employed herein are terrestrial forms, they will die off when the oil is all consumed. Hence, there is no need for clean-up after the microbial degradation has been completed.

The process of the invention can be applied to open waters and to beaches. It is particularly useful on rocky coasts where vehicles on wheels cannot traverse. The use of forest products such as sawdust, pine bark, wood flour, cotton linters, cottonseed hulls and/or straw, bagasse, marsh hay, shredded paper, etc., is used to help localize the oil spill and to prevent it from spreading further. The addition of, for example, cottonseed protein or soybean milling by-products together with added nitrogen and phosphorus nutrients, provides a balanced nutritional medium for the microorganisms. Since all of these additives are of agricultural or forest sources, they are safe and non-toxic. Additionally, these substances provide a matrix upon which the added mixture of microorganisms proceeds to degrade all of the absorbed oil.

The use of mixtures of microorganisms provides a larger resulting biomass useful in the food chain of higher forms of life. The degradation of petroleum proceeds more rapidly when the oil spill is seeded with as many as 8 to 15 different cultures. Such a technique provides a better means of attack for different substances which may be present in the oil slick.

EXAMPLE OF THE INVENTION

The following example is given merely as illustrative of the present invention and is not to be considered as limiting. Various preferred embodiments of the invention have been discussed throughout the application, and the following is only one specific example thereof.

EXAMPLE

An outdoor oil spillage clean-up field test was conducted on the eastern coast of Virginia. Two lagoons were selected. The test lagoon was roughly circular and about 75 feet in diameter with a 12 foot throat. The diameter varies somewhat with the tide. The test bed was a framework of boards 8 × 8 ft. square, the boards being 1 inch × 12 inches with flotation on the sides. The control lagoon was about 100 feet wide with a 20 ft. wide throat. Both lagoons, separated by about 350 feet of land, are ideal test sites. Crude petroleum (3.1 liters) was put into both the test bed and into the control bed.

A mixture of cultures of all sixteen microorganisms listed above was added to 7 lbs. of straw, 3 lbs. of bagasse and 4 ½ lbs. of Proflo (cottonseed protein). The resulting mixture was put into a 20 gal. plastic barrel. The heat of fermentation became quite high after a lapse of 3–4 hrs. The mixture as then strewn into the test bed. The control bed was left intact with the added oil.

The test and control sites were checked three days later. The oil in the test bed was essentially all degraded. The oil in the control bed was essentially unchanged. Wet amounts of samples taken from the test beds showed the presence of protozoa in the sample from the test bed, but none in the sample from the control bed. There were also microscopic green algae in the test sample, but none in the control.

On the sixth day, the oil in the test bed had been degraded to an extent of more than 95 percent, while there was substantially no change in the control bed. Again, wet mounts of samples taken from the test beds showed the presence of microscopic green algae and protozoa in the test bed sample, but none in the control bed sample.

Hence, the oil in the test bed was substantially degraded and the marine life therein was once again abundant. However, in the control bed where no microorganisms were placed, the oil slick remained and substantially destroyed all of the marine life originally present therein.

It thus can be seen that the present invention provides a desirable and advantageous way for degrading and cleaning up petroleum by means of microbial degradation, so as to restore the oil-polluted area to a habitable and ecologically-clean environment. This procedure is carried out safely and relatively economically without any harm whatsoever to human, animal or marine life.

It is to be understood that the present invention embraces the use not only of the above-described microorganisms, which are given merely for illustrative purposes, but it also includes the use of mutants produced from the specifically enumerated microorganisms, providing that they perform the same function. It is to be further understood that the invention includes the use of subcultures obtained by various standard microbiological techniques. Such mutants and/or subcultures may differ in certain respects from the above-described new strains, but will work to degrade petroleum in approximately the same manner as disclosed above.

The invention being thus described, it will be obvious that the same may be varied in many ways. Such variations are not to be regarded as a departure from the spirit and scope of the invention, and all such modifications as would be obvious to one skilled in the art are intended to be included herein.

I claim:

1. A process for the microbial degradation of aqueous polluting petroleum which comprises treating petroleum with at least one microorganism selected from the group consisting of non-pathogenic, protein-producing, petroleum-utilizing strains of *Aureobasidium pullulans*, *Myrothecium verrucaria*, *Cladosporium cladosporioides*, *Saccharomyces cerevisiae*, *Aspergillus sp.* and *Rhodotorula sp.* and mutants thereof for a sufficient time until the treated petroleum has been substantially degraded.

2. The process of claim 1, wherein said microorganism is mixed with a cellulosic material.

3. The process of claim 1, wherein said microorganism is mixed with a cellulosic material, a nitrogen source and a phosphorus source.

4. The process of claim 1, wherein said microorganism is added to the petroleum in an amount of at least about 2 pounds of wet packed cells per acre of petroleum surface.

5. The process of claim 1, wherein said microorganism is added to the petroleum in an amount of about 1 to 5 percent by weight of microorganism per volume of petroleum.

6. The process of claim 2, wherein said cellulosic material is selected from the group consisting of sawdust, pine bark, wood flour, cotton linters, cottonseed hulls, straw, bagasse, marsh hay and shredded paper.

7. The process of claim 3, wherein said nitrogen source is cottonseed protein.

8. The process of claim 1, wherein said microorganism is employed in a slurry form.

9. The process of claim 1, wherein said microorganism is employed in a pelletized form.

10. A process for the microbial degradation of polluting petroleum which comprises treating petroleum with at least one microorganism selected from the group consisting of *Aureobasidium pullulans* ATCC 20249, *Myrothecium verrucaria* ATCC 20250, *Cladosporium cladosporioides* ATCC 20251, *Saccharomyces cerevisiae* ATCC 20252, *Aspergillus sp.* ATCC 20253 and *Rhodotorula sp.* ATCC 20254 for a sufficient time until the treated petroleum has been substantially degraded.

11. The process of claim 10, wherein said microorganism is mixed with a cellulosic material.

12. The process of claim 10, wherein said microorganism is mixed with a cellulosic material, a nitrogen source and a phosphorus source.

13. The process of claim 10, wherein said microorganism is added to the petroleum in an amount of at least about 2 pounds of wet packed cells per acre of petroleum surface.

14. The process of claim 10, wherein said microorganism is added to the petroleum in an amount of about 1 to 5 percent by weight of microor-ganism per volume of petroleum.

15. The process of claim 11, wherein said cellulosic material is selected from the group consisting of sawdust, pine bark, wood flour, cotton linters, cottonseed hulls, straw, bagasse, marsh hay and shredded paper.

16. The process of claim 12, wherein said nitrogen source is cottonseed protein.

17. The process of claim 10, wherein said microorganism is employed in a slurry form.

18. The process of claim 10, wherein said microorganism is employed in a pelletized form.

19. The process of claim 10, wherein said microorganism is added to the petroleum at a temperature of approximately 2°C. to approximately 39°C.

20. The process of claim 10, wherein said microorganism is *Aureobasidium pullulans* ATCC 20249.

21. The process of claim 10, wherein said microorganism is *Myrothecium verrucaria* ATCC 20250.

22. The process of claim 10, wherein said microorganism is *Cladosporium cladosporioides* ATCC 20251.

23. The process of claim 10, wherein said microorganism is *Saccharomyces cerevisiae* ATCC 20252.

24. The process of claim 10, wherein said microorganism is *Aspergillus sp.* ATCC 20253.

25. The process of claim 10, wherein said microorganism is *Rhodotorula sp.* ATCC 20254.

* * * * *